Patented Jan. 19, 1937

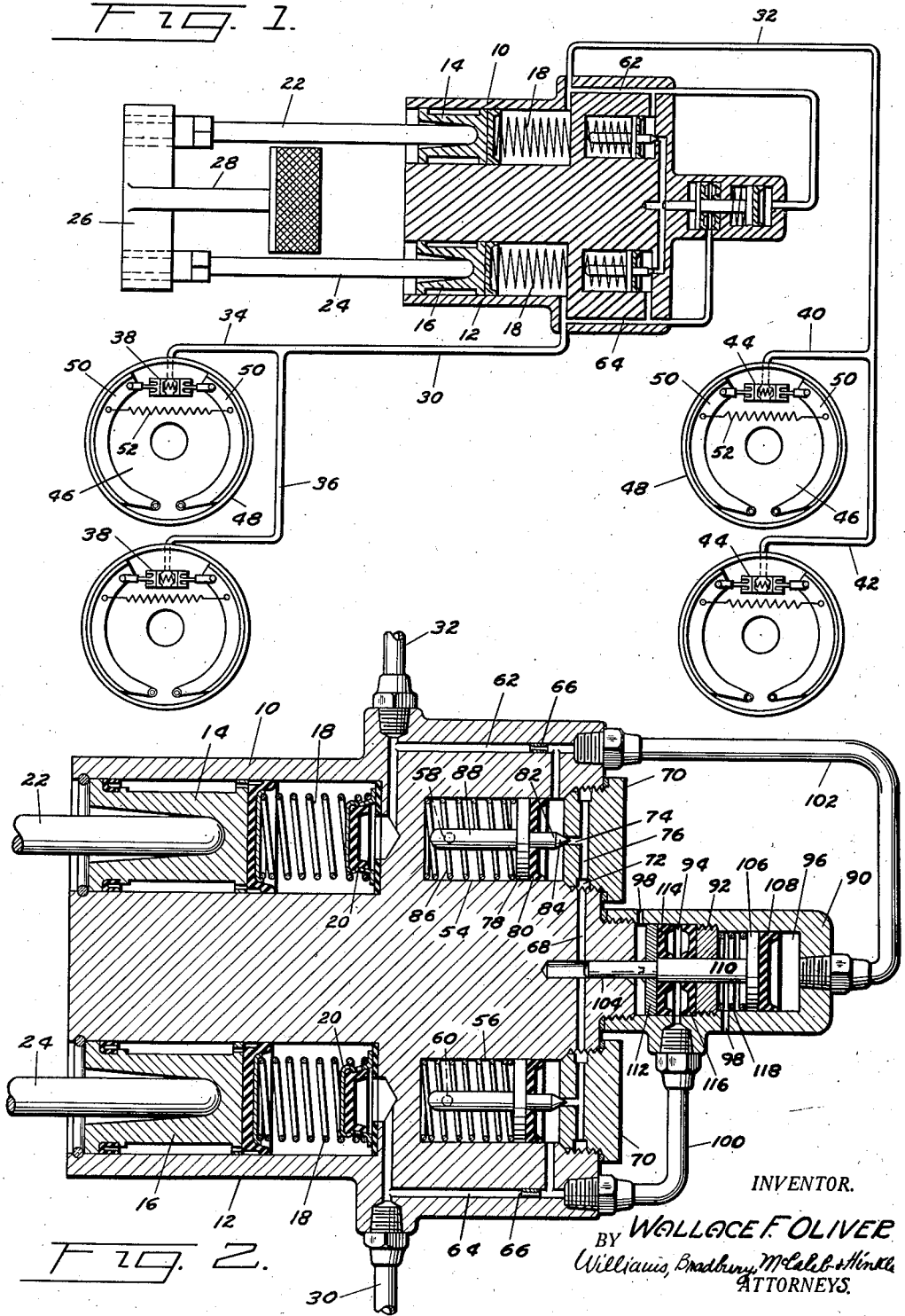

2,068,150

UNITED STATES PATENT OFFICE 2,068,150

HYDRAULIC BRAKE

Wallace F. Oliver, Detroit, Mich., assignor to Hydraulic Brake Company, Detroit, Mich., a corporation of California Application November 5, 1934, Serial No. 751,462

7 Claims. (Cl. 60—54.5)

This invention relates to brakes for motor vehicles and more particularly to hydraulic brakes for motor vehicles.

In hydraulic brake systems now used on motor vehicles, breakage or serious leakage of a distributing conduit of the system will result in a total loss of brake power.

An object of the invention is to provide means for controlling the flow of fluid through the conduits of a hydraulic brake system so that leakage in or breakage of any one of the conduits leading to the brakes will instantly result in the leaking or broken conduit being immediately closed off from communication with the system.

Other objects of the invention will appear from the following description taken in connection with the drawing which forms a part of this specification, and in which,—

Figure 1 is a diagrammatical illustration of a hydraulic brake system incorporating the invention; and Figure 2 is an enlarged sectional view of the equalizer.

Referring to the drawing for more specific details of the invention, a pair of cylinders 10 and 12 are arranged in parallel relation to one another and connected to a suitable source of fluid supply, not shown. Reciprocable pistons 14 and 16 mounted respectively in the respective cylinders 10 and 12 are urged to their retracted positions by springs 18 interposed between the heads of the respective pistons and two-way valves 20 controlling the discharge ports of the cylinders, and are movable on their compression strokes by thrust rods 22 and 24 suitably connected to a rock shaft 26 having a foot pedal lever 28 secured thereto.

The discharge ports of the cylinders 10 and 12 are connected to conduits 30 and 32. The conduit 30 has branched conduits 34 and 36 connected respectively to fluid pressure motors 38 of any conventional type suitable for the actuation of a pair of brakes which may be associated with the rear wheels of a motor vehicle. Similarly, the conduit 32 has branched conduits 40 and 42 connected respectively to fluid pressure motors 44 for actuation of another pair of brakes which may be associated with the front wheels of the motor vehicle.

The brakes are of a conventional type each including a backing plate 46, a drum 48 associated with the backing plate, a pair of friction elements 50 pivoted on the backing plate, and a fluid pressure motor such as is indicated at 38 or 44 for spreading the friction elements into engagement with the drum against the resistance of a retractile spring 52.

A pair of cylinders 54 and 56 suitably vented to the atmosphere as at 58 and 60 are preferably arranged in parallel relation to one another. The cylinder 54 is concentric to the cylinder 10 and the cylinder 56 is concentric to the cylinder 12, and these cylinders are connected respectively to the respective discharge ports of the cylinders 10 and 12 by passages 62 and 64 each having therein a restriction 66 and the cylinders are interconnected by a passage 68.

Each of the cylinders 54 and 56 has threaded therein a head 70 having a circumferential groove 72 communicating with the passage 68, an axial passage 74, and a diametral passage 76 providing a communication between the circumferential groove and the axial passage.

A reciprocal piston 78 in each of the cylinders 54 and 56 has on its head a leak-proof cup 80 for preventing the passage of fluid to the rear of the piston, and a plunger 82 having a conical head 84 for cooperation with the axial passage 74 in the head 70 of the cylinder. A relatively light spring 86 in the cylinder back of the piston urges the piston to seat the conical head 84 on the plunger 82 in the passage 74, and the piston is limited in its movement by a stop 88 carried on the back of the piston.

A cylinder 90 suitably arranged between the cylinders 54 and 56 has therein a diaphragm 92 dividing the cylinder 90 into two chambers 94 and 96, each vented to the atmosphere as at 98. The chamber 94 is connected by a conduit 100 to the passage 64, and the chamber 96 is connected by a conduit 102 to the passage 62, and a passage 104 provides a communication between the chamber 94 and the passage 68.

A reciprocable piston 106 in the chamber 96 has on its head a leak-proof cup 108 for preventing the passage of fluid to the rear of the piston, and a rod 110 formed integral with or suitably secured to the piston extends through the diaphragm 92, the chamber 94, and into the passage 104. Suitably secured to the rod 110 within the chamber 94 is a piston 112 having thereon a leak-proof cup 114, and seated on the diaphragm in oppositely disposed relation to the cup 114 is another leak-proof cup 116. These cups effectively prevent the passage of fluid past the diaphragm 92 and to the rear of the piston 112. A spring 118 interposed between the diaphragm 92 and the back of the piston 106 urges the pistons 106 and 112 to their retracted positions, and when the pistons are moved by fluid under pressure in the chambers 94 and 96 the rod 110 is moved to close the passage 68.

Under a normal operation, upon applying force to the pedal 28, the shaft 26 is moved through an angle, and this movement is transmitted through the thrust rods 22 and 24 to the pistons 14 and 16, resulting in moving the pistons on their compression strokes. As the pistons move on their compression strokes, fluid is discharged from the cylinders 10 and 12 through the conduits 30 and 32 and branch conduits 34, 36, 40 and 42 to the fluid pressure motors 38 and 44, causing actuation of these motors with the result that the friction elements 50 of the brakes are moved into engagement with the drums 48 against the resistance of their retractile springs 52. Upon release of the force applied to the foot pedal lever 28, this lever is returned to its normal position by a conventional retractile spring, not shown. This results in movement of the shaft 26, which movement is transmitted to the thrust pins 22 and 24 to retract the pins and release the force previously applied to the pistons 14 and 16, whereupon the pistons return to their retracted positions under the influence of springs 18 and 20; and as the pistons move to their retracted positions, fluid is returned from the fluid pressure motors 38 and 44 to the cylinders 10 and 12 due to the tension on the retractile springs 52 connected between the friction elements.

During the initial movement of the pistons 14 and 16 on their compression strokes, substantially equal pressure is maintained in the conduits 30 and 32, the passages 62 and 64 communicating with the conduits 30 and 32, and in the cylinders 54 and 56. Because of this the pistons 78 in the respective cylinders 54 and 56 are moved from their static positions at substantially the same time. This movement of the pistons 78 from their static positions opens the passages 74 and establishes communication between the cylinders 54 and 56. This insures perfect equalization of pressure in the system, and this equalized pressure is maintained until a predetermined pressure is reached. During this period the fluid pressure motors 38 and 44 are sufficiently actuated to spread the friction elements 50 of the brakes into engagement with the drums 48.

Upon attaining the predetermined pressure, further movement of the pistons 14 and 16 on their compression strokes results in building up pressure in the chambers 94 and 96 of the cylinder 90 sufficiently to actuate the pistons 106 and 112 against the resistance of the spring 118, whereupon the rod 110 of these pistons is moved to a position where it intercepts the passage 68 and thereby closes communication between the cylinders 54 and 56, and from this stage on throughout the remaining portion of the operation of applying the brakes, the system operates as a duplex system, one for applying the brakes associated with the rear wheels of the vehicle, and the other for applying the brakes associated with the front wheels of the vehicle, and under these conditions should either of the conduits 30 or 32 become defective, due to leakage or breakage, the other is in no way effected.

Should loss of pressure occur in either of the conduits 30 or 32 due to rupture during a braking application, the particular set of brakes dependent upon the ruptured conduit for actuation becomes inoperative. However, the other set of brakes dependent upon the unaffected conduit is in no way affected. This is due to the system operating as a duplex system during a braking application. It is essential to maintain this condition, and since the operation of the mechanism for accomplishing this is substantially identical, regardless of which conduit is ineffective, it is thought that the description of the operation may be limited by assuming that the conduit 30 becomes ineffective. Upon leakage or breakage of the conduit 30 during a braking application, pressure on the fluid in the cylinder 56 is released, whereupon the spring 86 urges the piston 78 to its seat wherein the head 84 on the plunger 82 closes the passage 74. Under these conditions, when the brake is released and subsequently applied, communication between the cylinders 54 and 56 remains closed, and hence only one set or pair of brakes may be operated. Because of the possibility of actuating the piston 78 upon a sudden subsequent application of the brakes and the resultant loss of fluid, the supply passage 64 is provided with a restriction 66 which inhibits the flow of fluid in sufficient volume to actuate the piston 78 when the conduit is defective.

Under the assumed condition of leakage or breakage of the conduit 30, the piston 14 will in a full application of the brakes build up sufficient pressure in the cylinder 96 to move rod 110 against the tension of spring 118 and thereby close passage 68. This interposes a further obstacle to intercommunication between the broken or leaky conduit 30 and the unimpaired conduit 32.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid pressure system of the class described, comprising a pair of compressors, a passageway connecting said compressors, valve means normally closing said passageway, fluid pressure responsive means for opening said valve means, a single valve for closing said passageway upon the creation of a pressure higher than that required to open said valve means, and fluid pressure responsive means for actuating said single valve.

2. A fluid pressure system of the class described, comprising a pair of compressors, means for actuating the compressors in unison, a passageway connecting said compressors, a valve means associated with each compressor and normally closing said passageway, means associated with each valve and actuated by the fluid pressure created by its compressor to open said valve, a transverse bore intersecting said passageway between said valves, means in said bore movable to close said passageway, a spring normally maintaining said means in position to permit flow through said passageway, and fluid pressure responsive means for moving said last-named means to a position closing said passageway.

3. In a fluid pressure system of the class described, the combination of a pair of compressors, a passageway connecting said compressors, means for operating said compressors in unison, a valve in said passageway, means normally maintaining said valve in open position, a pair of pistons for moving said valve to closed position, and means connecting each piston with one of said compressors.

4. In a hydraulic brake system of the class described, the combination of a pair of compressors, brake mechanism actuated by each compressor, means for operating said compressors in unison, a passageway connecting said compressors, and valve means for closing said passageway, said valve means comprising a stem having spaced pistons thereon, both pistons tending to move said stem in the same direction, means connecting each piston in fluid communication with a different compressor, and a spring for resisting the action of said pistons on said stem.

5. In a fluid pressure system of the class described, the combination of a pair of compressors, a passageway connecting said compressors, a pair of valves closing said passageway until a predetermined fluid pressure is created by each compressor, and valve means for closing said passageway upon the creation of a second and higher predetermined pressure when said system is functioning normally or upon the creation of a still higher pressure by one of said compressors when said system is functioning abnormally, said valve means comprising a movable valve element, a spring for urging said element toward open position, and separate pistons, each being subject to the fluid pressure created by one only of said compressors, said pistons both acting to move said valve element to closed position.

6. A fluid braking system comprising a pair of corresponding compressors arranged in parallel relation, a fluid pressure motor connected to each of the compressors, braking elements actuated by the motors, means for actuating the compressors in unison, a fluid pressure valve arranged coaxially of and connected to each of the compressors, a passage connecting the fluid pressure valves, said valves normally closing said passage but each valve being openable by pressure created by its compressor, and fluid actuated means controlling fluid flow through the passage, said means actuated by fluid under pressure in either or both of the compressors.

7. A fluid pressure system comprising a pair of corresponding compressors arranged in parallel relation to one another, a fluid pressure motor connected to each of the compressors, braking elements actuated by the fluid pressure motors, means for actuating the compressors in unison, a fluid pressure valve arranged coaxially of and connected to each of the compressors, a passage connecting the fluid pressure valves, said valves normally closing said passage but each valve being openable by pressure created by its compressor, a third fluid pressure valve controlling fluid flow through the passage, and means connecting the last-mentioned fluid pressure valve to the compressors for cooperative and independent actuation.

WALLACE F. OLIVER.